United States Patent
Berkmann (12)

(10) Patent No.: US 6,182,993 B1
(45) Date of Patent: Feb. 6, 2001

(54) ADJUSTING DEVICE FOR A SUSPENSION STRUT OF A MOTORCYCLE

(75) Inventor: Franz Berkmann, Munich (DE)

(73) Assignee: Bayerische Motoren Werke Aktiengesellschaft, Munich (DE)

( * ) Notice: Under 35 U.S.C. 154(b), the term of this patent shall be extended for 0 days.

(21) Appl. No.: 09/349,098

(22) Filed: Jul. 8, 1999

(30) Foreign Application Priority Data

Jul. 17, 1998 (DE) .............................................. 198 32 324

(51) Int. Cl.⁷ .................................................. B62K 21/00
(52) U.S. Cl. ............................................ 280/275; 280/276
(58) Field of Search .................................. 280/275, 276, 280/277; 180/219

(56) References Cited

U.S. PATENT DOCUMENTS

| 4,630,703 | 12/1986 | Fletcher . |
| 4,815,758 | 3/1989 | Yoshida ................................ 280/840 |
| 5,181,696 | 1/1993 | Abe ................................... 267/64.17 |

FOREIGN PATENT DOCUMENTS

| 3743944 A1 | 7/1989 | (DE) . |
| 3903272 A1 | 8/1989 | (DE) . |
| 3914297 A1 | 10/1990 | (DE) . |
| 19532088 A1 | 3/1997 | (DE) . |
| 19701272 A1 | 7/1998 | (DE) . |
| 0 814 015 | 12/1997 | (EP) . |
| 0972703 A2 | * 1/2000 | (EP) . |

OTHER PUBLICATIONS

Test & Technik Journal, 1991, Motorrad, S.8.
German Search Report, Feb. 22, 1999.

* cited by examiner

Primary Examiner—Brian L. Johnson
Assistant Examiner—Matthew Luby
(74) Attorney, Agent, or Firm—Evenson, McKeown, Edwards & Lenahan, P.L.L.C.

(57) ABSTRACT

A motorcycle has at least one suspension strut, with at least one manually operable adjusting mechanism for changing the spring pretensioning and/or damping properties of the suspension strut. The adjusting mechanism is mounted separately from the suspension strut on the motorcycle. At least one actuating element or member on the adjusting mechanism can be brought into two different positions on the motorcycle, an adjusting position for manually adjusting the adjusting mechanism and a stowage position in which the adjusting member is located so that it does not project beyond a contour of the motorcycle located nearby.

33 Claims, 4 Drawing Sheets

ADJUSTING DEVICE FOR A SUSPENSION STRUT OF A MOTORCYCLE

BACKGROUND AND SUMMARY OF THE INVENTION

This application claims the priority of German application 198 32 324.7, filed in Germany on Jul. 17, 1998, the disclosure of which is expressly incorporated by reference herein.

The invention relates to an adjusting device for a suspension strut of a motorcycle.

Adjusting the suspension struts of motorcycles is already known. Thus, the spring base can be adjusted by a handwheel connected hydraulically with the suspension strut. It is also known that the damping characteristic of the suspension strut can be changed by adjusting its rebound stage. This adjustment is made directly at the suspension strut.

An adjusting handwheel cannot generally be positioned so that it both fits smoothly into the vehicle design and facilitates adjustment without difficulty from the ergonomic standpoint. Located externally on the motorcycle, the handwheel may disturb the contour of the outer skin or trim. When the handwheel is located beneath the seat, the available space is usually too small to allow grasping the handwheel properly.

German Patent Document No. DE 36 03 955 C2 describes a damping-force adjusting mechanism for a hydraulic damper in which the adjustment is performed by an electric motor. A solution of this kind is too cumbersome for motorcycles and is disadvantageous because of its higher weight.

A goal of the invention is to provide an adjusting device for a suspension strut of a motorcycle that can both operate in an ergonomically favorable manner and fit into the vehicle design without disturbing the overall design appearance of the motorcycle.

This goal is achieved according to the invention by providing an adjustment mechanism for a motorcycle suspension strut which includes a manually engageable adjusting member which is separate from the suspension strut and movable between an adjusting position where it is readily accessible to the motorcycle driver and a stowage or stowage position where it is disposed within the outer contour of adjacent motorcycle body structure.

According to the invention, a motorcycle with at least one suspension strut, with at least one manually operable adjusting mechanism for changing the spring pretension and/or damping properties of the suspension strut, and with the adjusting mechanism being mounted separately from the suspension strut on the motorcycle, is characterized in that at least one actuating element of the adjusting mechanism can be brought into two different positions relative to the motorcycle, an adjusting position for manual adjustment of the adjusting mechanism and a stowage or stowage position in which the adjusting mechanism is located so that it no longer projects beyond a contour of the motorcycle located in its vicinity.

Thus the manually operable adjusting mechanism can assume both an ergonomically favorable position on the motorcycle for adjustment and a position in which it fits smoothly into the vehicle design.

In certain preferred embodiments of the invention, provision is made for the adjusting mechanism together with the actuating element or the actuating element of the adjusting mechanism to be mounted on the motorcycle in such fashion that it can be brought by a translational movement or by a pivoting movement, especially against the force of a toggle spring, from the stowage position into the adjusting position.

A simple design for the invention is achieved by using one of the abovementioned methods for mounting it on the motorcycle.

When the adjusting mechanism with the actuating element or the actuating element of the adjusting mechanism is mounted by an articulated drive on the motorcycle, it is possible better to adjust the travel of the actuating element from the stowage position into the actuating position to the conditions on the motorcycle regarding free stowage space for the adjusting mechanism.

If the suspension strut is adjusted hydraulically, a master cylinder is necessary and the suspension strut is then advantageously connected with the adjusting mechanism by a hydraulic line. For mechanical adjustment of the suspension strut, the strut is connected with the adjusting mechanism by a rotatable mechanical connection.

In an especially preferred embodiment of the invention, the spring pretensioning is changed by the adjusting mechanism by adjusting a spring base and/or the damping properties are adjusted by adjusting the rebound of a suspension strut. It is advantageous in this regard that the adjusting mechanism with the operating element, or the operating element of the adjusting mechanism, can be mounted on the motorcycle in such fashion that it can be adjusted by the driver during travel.

If the adjusting mechanism with the operating element, or the operating element of the adjusting mechanism, is mounted beneath the motorcycle seat, it is very advantageous for the seat to be mounted foldably on the motorcycle and held in the open position by a gas compression spring.

Other objects, advantages and novel features of the present invention will become apparent from the following detailed description of the invention when considered in conjunction with the accompanying drawings.

DETAILED DESCRIPTION OF THE INVENTION

Figure 1:
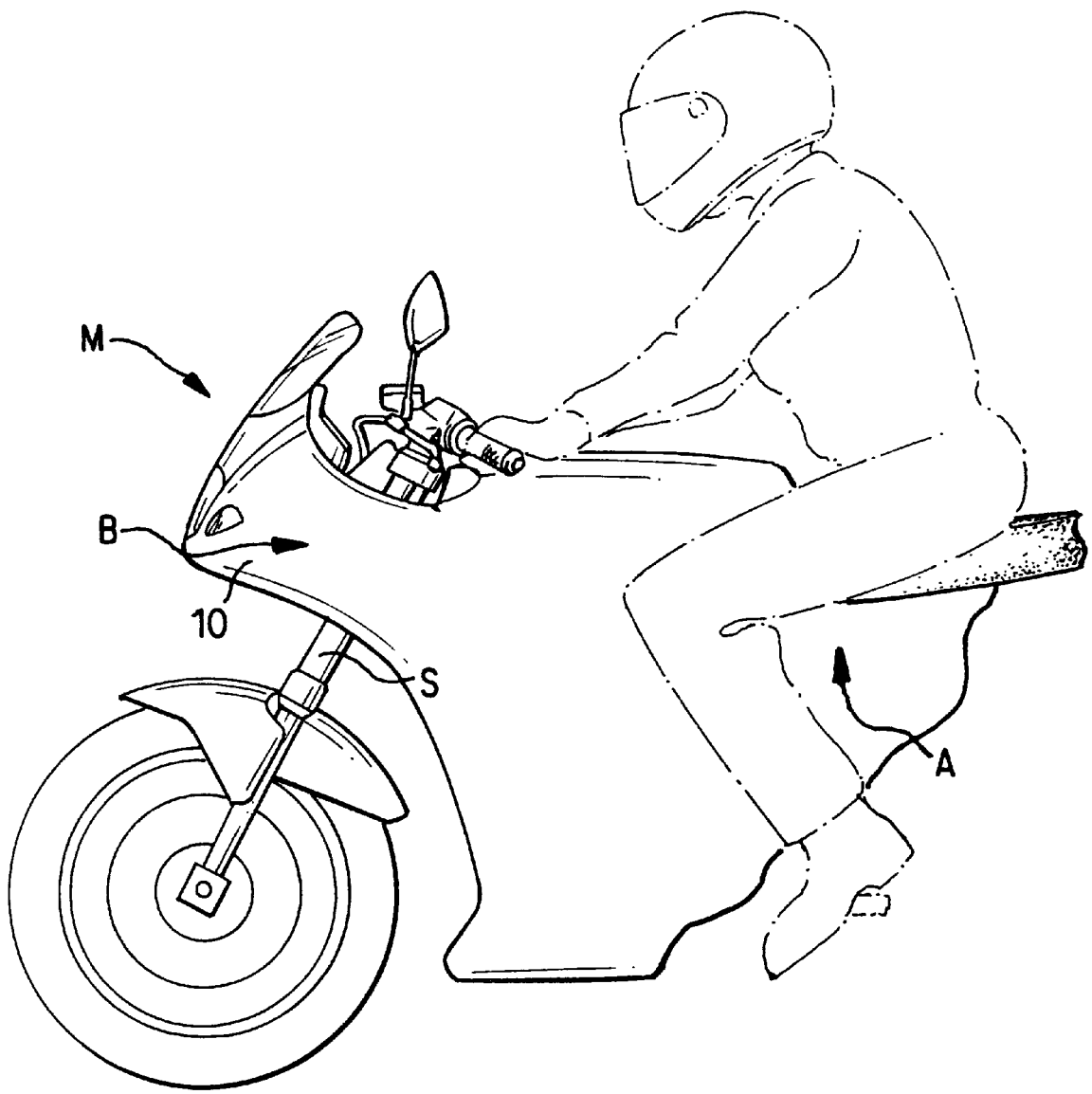
FIG. 1 is a schematic side view of a motorcycle, showing general locations of suspension strut adjustment mechanisms according to preferred embodiments of the invention.
Figure 2:
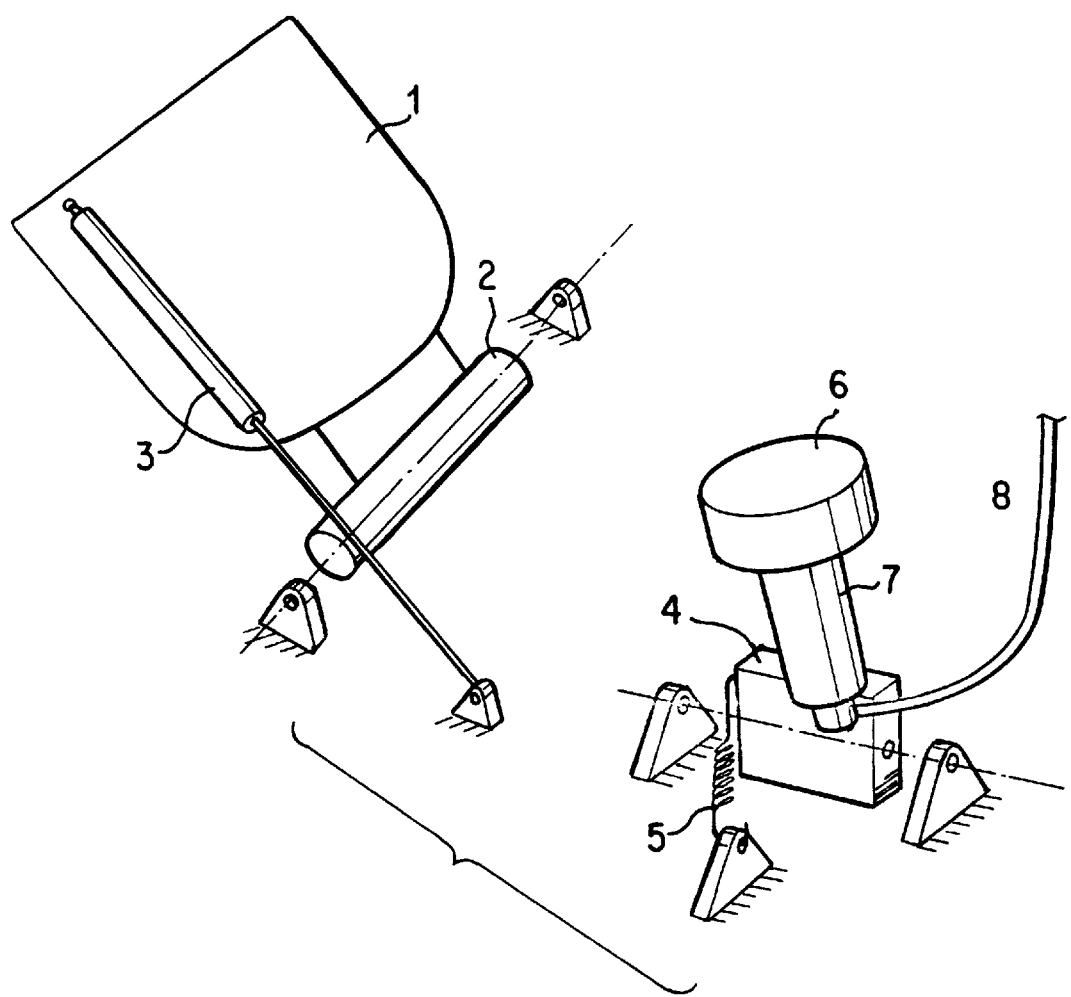
FIG. 2 is a schematic view showing a motorcycle seat folded upward with an adjusting device located beneath it for a suspension strut of a motorcycle in the adjusting position, constructed according to a preferred embodiment of the present invention.
Figure 3:
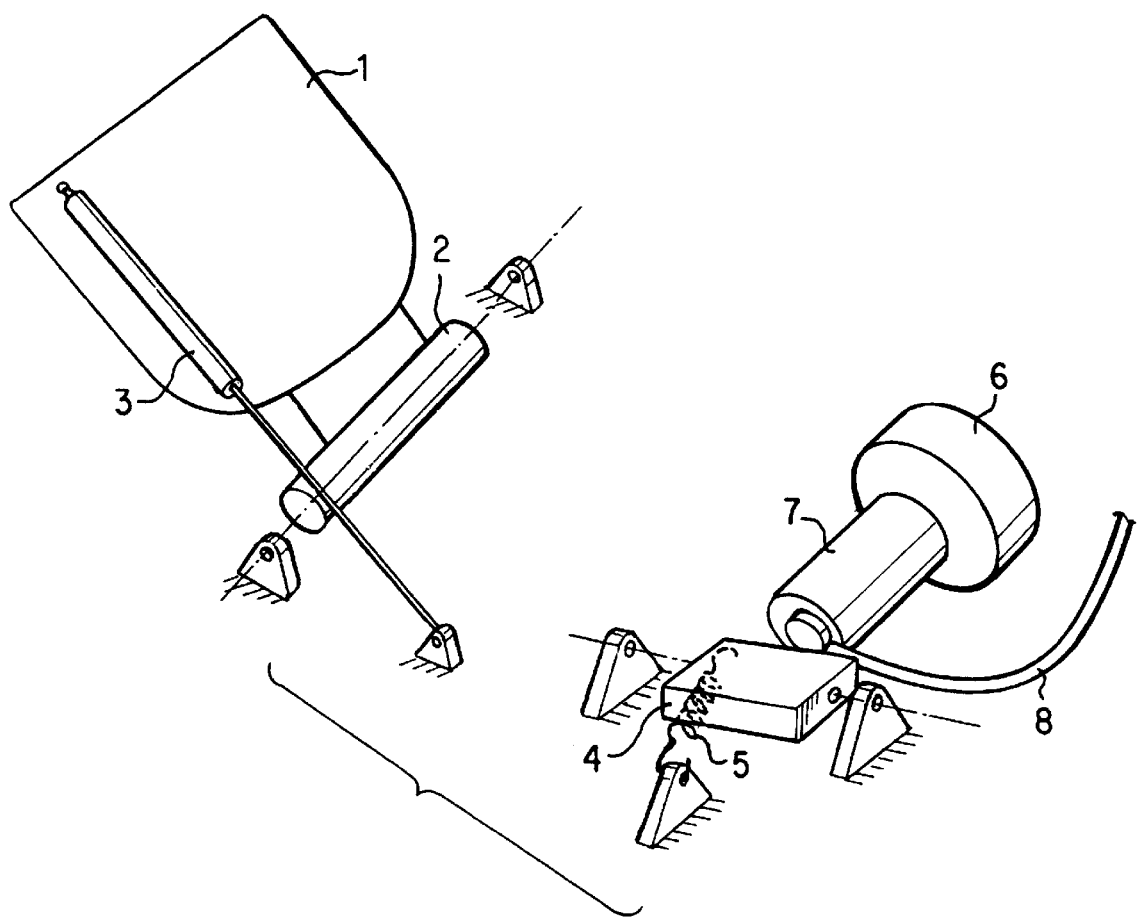
FIG. 3 is a schematic view of the embodiment of FIG. 2, showing the adjusting device in the stowage position.
Figure 4:
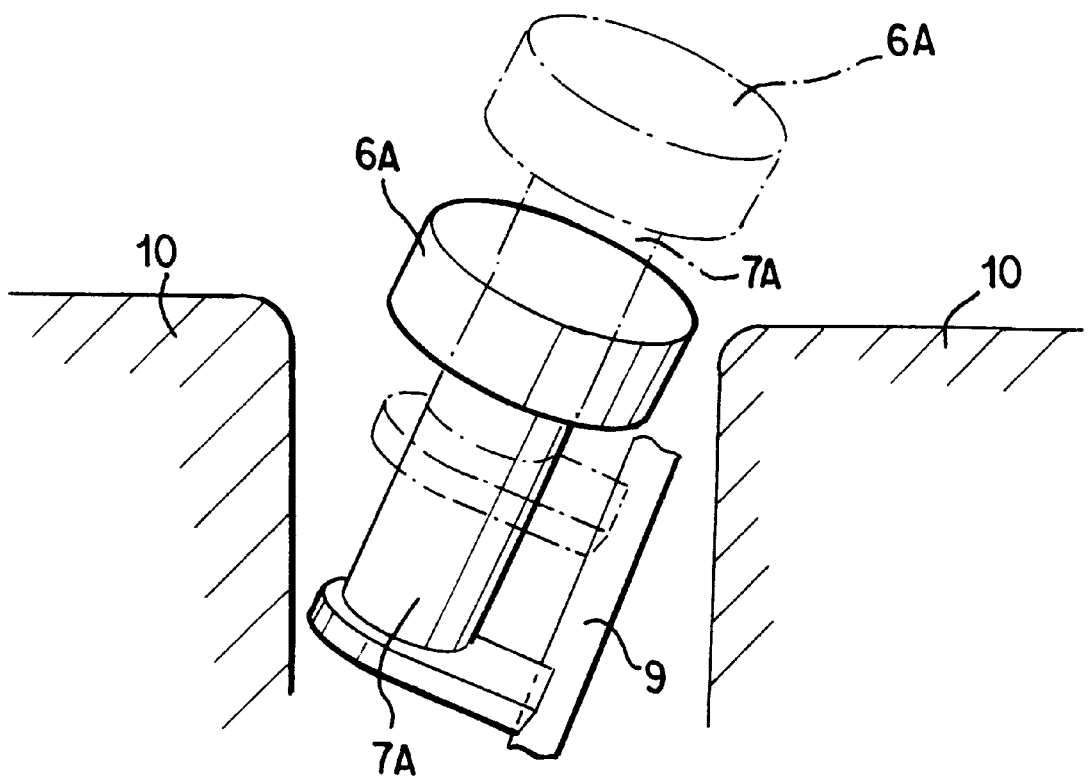
FIG. 4 shows another adjusting device in the stowage position and in the adjusting position (indicated by dotted lines), constructed according to a preferred embodiment of the present invention.

FIG. 1 is a schematic side view of a front part of a motorcycle which includes an adjustable suspension strut S for the front wheel. The suspension strut S can be manually adjusted by the motorcycle driver using an adjusting mechanism configured in accordance with preferred embodiments of the invention. FIG. 1 schematically depicts the alternate locations A and B of the manually engageable adjusting element of the suspension strut. Location A is at the motorcycle seat, and this embodiment is illustrated in FIGS. 2 and 3. Location B is at the motorcycle front body or fender trim 10, and this embodiment is illustrated in FIG. 4.

According to FIG. 2, an adjusting device according to the invention is provided for the suspension struts of the motorcycle beneath a motorcycle seat 1. The motorcycle seat 1 is fastened to the motorcycle so that it can be folded upward by means of a hinge 2. A gas compression spring 3 holds the motorcycle seat 1 in the raised position and facilitates the raising process.

A suspension strut adjusting mechanism is mounted beneath the motorcycle seat 1 that can be pivoted around the axis 4 against the force of toggle spring 5, with an operating element 14 to change the damping properties of the struts. The operating element is shown as a handwheel 6 whose rotation affects the adjusting mechanism, a master cylinder 7, so that a spring base adjustment is performed on the suspension struts. For this purpose, the master cylinder 7 is connected by a hydraulic line 8 with the struts.

In FIG. 3, the master cylinder 7 is in one of its two end positions, the adjusting position, in which handwheel 6 can be gripped in an ergonomically favorable manner. In this position of master cylinder 7 the motorcycle seat 1 could not be folded back into its closed position. For this purpose, the master cylinder 7 must first be pivoted around axis 4 into its other end position, the stowage position. This is shown in FIG. 3. The master cylinder 7 with handwheel 6 is secured in its two positions, the stowage position and the adjusting position, by toggle spring 5.

FIG. 4 shows a translationally adjustable adjusting device composed of handwheel 6A and master cylinder 7A. The adjusting device is mounted on a rail 9 integral with the motorcycle and can be moved back and forth translationally between the stowage position and the adjusting position (dashed line showing). In the stowage position, the adjusting device fits optically and aerodynamically advantageously into the outer contour of the trim or body fender 10 of the motorcycle M. In the adjusting position, it is ergonomically ideally operable as it projects from the outside contour of the trim 10 of the motorcycle.

The invention is not limited to the embodiments described. In particular, the transmission of force from the operating element or the adjusting device can also be performed mechanically using transmission mechanisms that are conventional for the individual skilled in the art. In addition, a rebound adjustment designed in this manner is possible for the suspension strut and the actuating element can be mounted on the motorcycle in such fashion that it can be adjusted by the driver during travel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle comprising:
   an adjustable wheel suspension strut, and
   an adjusting mechanism separate from the suspension strut and operable to change suspension characteristics of the suspension strut,
   wherein said adjusting mechanism includes a manually engageable adjusting member which is selectively movable between a stowage position within an outer contour of adjacent motorcycle structure and an adjusting position projecting out of said outer contour.

2. A motorcycle according to claim 1, wherein said wheel suspension strut includes a hydraulic pressure line, and
   wherein said adjusting mechanism is operable to change the hydraulic pressure in said pressure line.

3. A motorcycle according to claim 1, wherein said adjusting member is disposed under a motorcycle seat when in said stowage position.

4. A motorcycle according to claim 3, wherein the seat is pivotally mounted on the motorcycle and acted on by a compression spring when moved to an open position to accommodate movement of the adjusting member to its adjusting position.

5. A motorcycle according to claim 1, wherein said adjusting member is disposed under trim of the motorcycle when in said stowage position.

6. A motorcycle according to claim 2, wherein said adjusting member is disposed under a motorcycle seat when in said stowage position.

7. A motorcycle according to claim 2, wherein said adjusting member is disposed under trim of the motorcycle when in said stowage position.

8. A motorcycle according to claim 1, wherein said adjusting member configured to move linearly between said stowage and adjusting positions.

9. A motorcycle according to claim 1, wherein said adjusting member is configured to pivotally move between said stowage and adjusting position.

10. A motorcycle according to claim 1, wherein said adjusting member is a rotatable handwheel which is pivotally supported at the motorcycle for movement between said stowage and adjusting position.

11. A motorcycle according to claim 10, wherein said handwheel is operable to control fluid pressure in a hydraulic line leading to the suspension strut.

12. A motorcycle according to claim 11, wherein said handwheel is disposed under a motorcycle seat when in said stowage position.

13. A motorcycle according to claim 1, wherein said adjusting member is a rotatable handwheel which is slidably supported at a rail fixed to the motorcycle for movement between said stowage and adjusting positions.

14. A motorcycle according to claim 13, wherein said handwheel is operable to control fluid pressure in a hydraulic line leading to the suspension strut.

15. A motorcycle according to claim 1, wherein said adjusting mechanism is operable to adjust a spring base of the suspension strut.

16. A motorcycle according to claim 1, wherein said adjusting mechanism is operable to adjust rebound characteristics of the suspension strut.

17. A motorcycle according to claim 1, wherein said adjusting mechanism is operable to accommodate adjustment of the suspension strut during travel of the motorcycle.

18. A motorcycle according to claim 1, wherein said adjusting mechanism includes an articulated drive supporting the adjusting member.

19. Motorcycle comprising at least one suspension strut,
   at least one manually operable adjusting means for changing spring pretensioning and/or damping properties of the suspension strut, with the adjusting means being mounted separately from the suspension strut on the motorcycle, and
   at least one operating element for the adjusting means which can be brought into two different positions relative to the motorcycle including an adjusting position for manually adjusting the adjusting means and a stowage position in which the adjusting means are located so that they do not project beyond an adjacent outer contour of the motorcycle.

20. Motorcycle according to claim 19, wherein the adjusting means with the operating element of the adjusting means is mounted on the motorcycle in such fashion that it can be brought from the stowage position into the adjusting position by a translational movement.

21. Motorcycle according to claim 19, wherein the adjusting means with the actuating element, or the actuating element of the adjusting means, is on the motorcycle so that it can be brought by a pivoting movement, especially against the force of a toggle spring, from the stowage position into the adjusting position.

22. Motorcycle according to claim 21, wherein the adjusting means with the actuating element, or the actuating element of the adjusting means, can be mounted by an articulated drive on the motorcycle.

23. Motorcycle according to claim 19, wherein the suspension strut is connected with the adjusting means by a hydraulic line.

24. Motorcycle according to claim 19, wherein the suspension strut is connected with the adjusting means by a rotatable mechanical connection.

25. Motorcycle according to claim 19, wherein spring pretensioning of the suspension strut is changed by using the adjusting means to adjust a spring base.

26. Motorcycle according to claim 19, wherein the damping properties of the suspension strut are changed using the adjusting means to adjust the rebound of the suspension strut.

27. Motorcycle according to claim 19, wherein the adjusting means is mounted with the actuating element, or the actuating element of the adjusting means, on the motorcycle in such fashion that it can be adjusted by the driver during travel.

28. Motorcycle according to claim 19, wherein the adjusting means together with the actuating element, or the actuating element of the adjusting means, is accommodated beneath a seat of the motorcycle.

29. Motorcycle according to claim 28, wherein the seat is mounted foldably on the motorcycle and is held in the open position by a gas compression spring.

30. A motorcycle wheel suspension assembly comprising:

an adjustable wheel suspension strut, and an adjusting mechanism separate from the suspension strut and operable to change suspension characteristics of the suspension strut, wherein said adjusting mechanism includes a manually engageable adjusting member is selectively movable between a stowage position within an outer contour of adjacent motorcycle structure and an adjusting position projecting out of said outer contour.

31. A wheel suspension assembly according to claim 30, wherein said wheel suspension strut includes a hydraulic pressure line, and wherein said adjusting mechanism is operable to change the hydraulic pressure in said pressure line.

32. A wheel suspension assembly according to claim 30, wherein said adjusting member is disposed in use under a motorcycle seat when in said stowage position.

33. A wheel suspension assembly according to claim 30, wherein said adjusting member is disposed under trim of the motorcycle when in said stowage position.

* * * * *